(12) United States Patent
Boehm

(10) Patent No.: US 9,838,822 B2
(45) Date of Patent: Dec. 5, 2017

(54) METHOD AND APPARATUS FOR ENHANCING DIRECTIVITY OF A 1ST ORDER AMBISONICS SIGNAL

(71) Applicant: Dolby Laboratories Licensing Corporation, San Francisco, CA (US)

(72) Inventor: Johannes Boehm, Goettingen (DE)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 30 days.

(21) Appl. No.: 14/779,326

(22) PCT Filed: Mar. 17, 2014

(86) PCT No.: PCT/EP2014/055313
§ 371 (c)(1),
(2) Date: Sep. 22, 2015

(87) PCT Pub. No.: WO2014/147029
PCT Pub. Date: Sep. 25, 2014

(65) Prior Publication Data
US 2016/0057556 A1 Feb. 25, 2016

(30) Foreign Application Priority Data
Mar. 22, 2013 (EP) .................................... 13305352

(51) Int. Cl.
*H04S 7/00* (2006.01)
*G06F 17/15* (2006.01)
(Continued)

(52) U.S. Cl.
CPC .............. *H04S 7/30* (2013.01); *G06F 17/156* (2013.01); *G10L 19/008* (2013.01); *G10L 21/02* (2013.01);
(Continued)

(58) Field of Classification Search
None
See application file for complete search history.

(56) References Cited

U.S. PATENT DOCUMENTS 4,042,779 A 8/1977 Craven
7,359,520 B2 4/2008 Brennan et al.
(Continued)

FOREIGN PATENT DOCUMENTS

CN 101977349 2/2011
EP 629335 5/1999
(Continued)

OTHER PUBLICATIONS

Trevino et al, "High order ambisonic decoding method for irregular loudspeaker arrays." pp. 1-8. Aug. 23-27, 2010. https://www.acoustics.asn.au/conference_proceedings/ICA2010/cdrom-ICA2010/papers/p481.pdf.*

(Continued)

*Primary Examiner* — Curtis Kuntz
*Assistant Examiner* — Qin Zhu

(57) ABSTRACT

Recordings from microphones that provide $1^{st}$ order Ambisonics signals, so-called B-format signals, offer a limited cognition of sound directivity. Sound sources are perceived broader than they actually are, especially for off-center listening positions, and the sound sources are often located to be coming from the closest speaker positions. In a method and apparatus for enhancing the directivity of $1^{st}$ order Ambisonics signals, additional directivity information is extracted (SFA) from the lower order Ambisonics input signal. The additional directivity information is used to estimate higher order Ambisonics coefficients, which are then combined with the coefficients of the input signal. Thus, the directivity of the Ambisonics signal is enhanced, which leads to an increased accuracy of spatial source localization when the Ambisonics signal is decoded (Continued)

to loud speaker signals. The resulting output signal has more energy than the input signal.

23 Claims, 3 Drawing Sheets

(51) Int. Cl.
  *G10L 21/02* (2013.01)
  *G10L 19/008* (2013.01)
(52) U.S. Cl.
  CPC ....... *H04S 2400/11* (2013.01); *H04S 2400/15* (2013.01); *H04S 2420/11* (2013.01)

(56) References Cited

U.S. PATENT DOCUMENTS

| | | | |
|---|---|---|---|
| 7,787,638 B2 | 8/2010 | Lokki et al. | |
| 2005/0080616 A1* | 4/2005 | Leung | H04R 5/027 704/200.1 |
| 2006/0126852 A1 | 6/2006 | Bruno et al. | |
| 2008/0298597 A1* | 12/2008 | Turku | H04S 5/00 381/27 |
| 2010/0329466 A1 | 12/2010 | Berge et al. | |
| 2012/0259442 A1* | 10/2012 | Jin | H04S 7/30 700/94 |
| 2012/0308015 A1* | 12/2012 | Ramteke | H04S 3/02 381/17 |
| 2013/0148812 A1* | 6/2013 | Corteel | H04S 7/30 381/17 |
| 2013/0216070 A1* | 8/2013 | Keiler | G10L 19/008 381/300 |
| 2014/0146984 A1* | 5/2014 | Kim | H04R 5/00 381/307 |

FOREIGN PATENT DOCUMENTS

| | | |
|---|---|---|
| EP | 2205007 | 7/2010 |
| JP | 2008187749 | 8/2008 |
| KR | 10102189 | 3/2011 |

OTHER PUBLICATIONS

Hollerweger, "An introduction to higher order ambisonic." pp. 1-13. Oct. 2008. http://flo.mur.at/writings/HOA-intro.pdf.*
Hodges, "Channel Formats." pp. 1-2. Mar. 6, 2011. https://ambisonic.info/ambisonics/channels.html.*
Bertet et al, "Investigation of the perceived spatial resolution of higher order ambisonic sound fields: a subjective evaluation involving virtual and real 3D microphones." pp. 1-9. Mar. 15-17, 2007. http://www.aes.org/tmpFiles/elib/20160827/13925.pdf.*
Moreau et al, "3D sound field recording with higher order ambisonics—objective measurements and validation of spherical microphone." pp. 1-24. May 20-23, 2006. http://www.aes.org/tmpFiles/elib/20160827/13661.pdf.*
Pulkki et al., "Spatial Sound Reproduction with Directional Audio Coding", JAES, AES vol. 55, No. 6, Jun. 15, 2007, pp. 503-516.
Ahonen et al., "Diffuseness Estimation using Temporal Variation of Intensity Vectors", IEEE Workshop on Applications Processing to Audio and Acoustics, Oct. 18-21, 2009; pp. 285-288.
Malham.: "Higher Order Ambisonic Systems; Abstracted from Space in Music—Music in Space", PhD thesis, University of York, Apr. 2003; pp. 1-12.
Poletti: "Unified description of ambisonics using real and complex spherical harmonics", In Proceedings of the Ambisonics Symposium, Graz, Austria, Jun. 25-27, 2009; pp. 1-10.
Poletti : "Three-dimensional surround sound systems based on spherical harmonics", J. Audio Eng. Soc. 53(11), Nov. 2005, pp. 1004-1025.
Pulkki : "Virtual Sound Source Positioningt Using Vector Base Amplitude Panning", J. Audio Eng. Soc. 45(6), Jun. 1997, pp. 456-466.
Williams: "Fourier Acoustics", ISBN 9780127539607, Academic Press 1999, ScienceDirect.com; pp. 1-2.
Zölzer : "DAFX Digital Audio Effects", Abstract; ISBN-13: 978-0470665992; p. 1.
Zotter: "Analysis and Synthesis of Sound Radiation with Spherical Arrays", PhD thesis, Institute of Electronic Music and Acoutstics (IEM), 2009; pp. 1-192.
Daniel: "Representation de champs acoustiques application a la transmission et a la repropuction de scenes sonores complexes dans un contexte multimedia" PhD thesis, Universite Oaris; Jul. 31, 2001; pp. 1-319.
Merimaa: "Analysis Synthesis and Perception of Spatial Sound—Binaural Localization Modelling and Multichannel Loudspeaker Reproduction", Phd thesis, Helsinki University of Technology, Report 77; Jun. 30, 2006; pp. 1-196.
Thiergart et al., "Three-dimensional sound field analysis with directional audio coding based on signal adaptive parameter estimators", AES 40 Th International Conference, Tokyo, Japan, Oct. 8-10, 2010; pp. 1-9.
Search Report dated May 16, 2014.

* cited by examiner a)

b)

a)            b)

METHOD AND APPARATUS FOR ENHANCING DIRECTIVITY OF A 1ST ORDER AMBISONICS SIGNAL

This application claims the benefit, under 35 U.S.C. §365 of International Application PCT/EP2014/055313, filed Mar. 17, 2014, which was published in accordance with PCT Article 21(2) on Sep. 25, 2014 in English and which claims the benefit of European patent application No. 13305352.0, filed Mar. 22, 2013.

FIELD OF THE INVENTION

The invention relates to the field of Ambisonics audio signal processing and acoustics.

BACKGROUND

Ambisonics is a technology that describes an audio scene in terms of sound pressure, and addresses the recording, production, transmission and playback of complex audio scenes with superior spatial resolution, both in 2D and 3D. In Ambisonics, a spatial audio scene is described by coefficients $A_n^m(k)$ of a Fourier-Bessel series. Microphone arrays that provide $1^{st}$ order Ambisonics signals as so-called B-format signals are known. However, decoding and rendering $1^{st}$ order Ambisonics signals to speaker arrangements for 2D surround or 3D only offers a limited cognition of sound directivity. Sound sources are often perceived to be broader than they actually are. Especially for off-center listening positions, the sound sources are often located as coming from the closest speaker positions, instead of their intended virtual position between speakers. The $1^{st}$ order Ambisonics (B-format) signals are composed out of four coefficients of a Fourier-Bessel series description of the sound pressure, which form a 3D sound field representation. These are the W channel (mono mix, or $0^{th}$ order) and the X,Y,Z channels ($1^{st}$ order). Higher order signals use more coefficients, which increases the accuracy of spatial source localization when the coefficients are decoded to speaker signals. However, such higher order signals are not included in B-format signals provided by microphone arrays.

Directional Audio Coding (DirAC) is a known technique [5,9] for representing or reproducing audio signals. It uses a B-format decoder that separates direct sound from diffuse sound, then uses Vector-Based Amplitude Panning (VBAP) for selective amplification of the direct sound in the frequency domain, and after synthesis filtering finally provides speaker signals at its output.

FIG. 1 a) shows the structure of DirAC-based B-format decoding. The B-Format signals 10 are time domain signals, and are filtered in an analysis filter bank $AFB_D$ into K frequency bands 11. A sound field analysis block $SFA_D$ estimates a diffuseness estimate $\Psi(f_k)$ 13 and directions-of-arrival (DoA) 12. The DoA are the azimuth $\phi(f_k)$ and inclination $\Theta(f_k)$ of the directions to the source at a particular mid frequency of a band k. A $1^{st}$ order Ambisonics decoder AmbD renders the Ambisonics signals to L speaker signals 14. A direct-diffuse separation block DDS separates the $1^{st}$ order Ambisonics signals into L direct sound signals 15 and L diffuse sound signals 16, using a filter that is determined from the diffuseness estimate 13. The L diffuse sound signals 16 are derived by multiplying the output 14 of the decoder AmbD with $\sqrt{\Psi(f_k)}$, which is obtained from the diffuseness estimate 13. The directional signals are derived from multiplication with $\sqrt{1-\Psi(f_k)}$. The direct sound signals 15 are further processed using a technique called Vector Base Amplitude Panning (VBAP) [8]. In a VBAP unit VP, a gain value for each speaker signal (in each frequency band) is multiplied to pan the direct sound to the desired directions, according to the DoA 12 and the positions of the speakers. The diffuse signals 16 are de-correlated by de-correlation filtering DF, and the de-correlated diffuse signals 17 are added to the direct sound signals being obtained from the VPAB unit VP. A synthesis filter bank $SFB_D$ combines the frequency bands to a time domain signal 19, which can be reproduced by L speakers. Smoothing filters (not shown in FIG. 1) for temporal integration are applied to calculate the diffuseness estimate $\Psi(f)$ 13 and to smooth the gain values that were derived by VBAP.

FIG. 1 b) shows details of the sound field analysis block $SFA_D$. The B-format signals represent a sound field in the frequency domain at the origin (observation position, r=0). The sound intensity describes the transport of kinetic and potential energy in a sound field. In the sound field, not all local movement of sound energy corresponds to a net transport. Active intensity $I_a$ (time averaged acoustic intensity, DoA~$I_a$) is the rate of directive net energy transport—energy per unit time for the three Cartesian directions. The active intensity 11a of the B-format signal 11 is obtained in an active intensity analysis block $AIA_D$, and provided to a diffuseness analysis block $DAB_D$ and a DoA analysis block $DOAAB_D$, which output the DoA 12 and the diffuseness estimate 13, respectively. More about DirAC is described in [9], the underlying theory in [5].

SUMMARY OF THE INVENTION

It would be desirable to enhance the directivity of $1^{st}$ order Ambisonics signals, such as B-format microphone recordings. Such directivity enhancement is desired for a more realistic replay, or for mixing real recoded sound with other higher order content, e.g. for dubbing film sound that is intended to be replayed for different speaker setups. One problem to be solved by the invention is to enhance the directivity of $1^{st}$ order Ambisonics signals or B-format signals, even if higher order coefficients for such signals are not available.

According to the invention, this and other problems can be solved by selectively amplifying direct sound components, while diffuse sound components are not changed. When selectively amplifying direct sound, it is advantageous that an Ambisonics formatted signal with increased order is obtained, because it can easily be mixed with other Ambisonics formatted signals. With the present invention, it is possible to increase the order of a $1^{st}$ order Ambisonics signal, whereby only directional sound components are considered. This results again in an Ambisonics formatted signal, but with higher order (i.e. at least $2^{nd}$ order). In principle, the disclosed method for enhancing directivity of a $1^{st}$ order Ambisonics signal derives higher order coefficients from the $1^{st}$ order coefficient information and adds the derived higher order coefficients to the Ambisonics signal. Thus, the $1^{st}$ order coefficient information (i.e. $0^{th}$ and $1^{st}$ order coefficients) of the $1^{st}$ order Ambisonics signal is advantageously maintained (except for a re-formatting, in one embodiment).

In other words, additional directivity information is extracted from the lower order Ambisonics signal, and the additional directivity information is used to estimate higher order coefficients. In this way, the directivity of the Ambisonics signal is enhanced, which leads to an increased accuracy of spatial source localization when the Ambisonics signal is decoded to loud speaker signals. One effect of the invention is that the resulting output signal has more energy than the input signal.

The present invention relates to a method for enhancing directivity of an input signal being a $1^{st}$ order Ambisonics signal and having coefficients of $0^{th}$ order and $1^{st}$ order, as defined in claim 1.

The present invention relates also to an apparatus for enhancing directivity of a $1^{st}$ order Ambisonics signal having coefficients of $0^{th}$ order and $1^{st}$ order, as defined in claim 9.

Further, the present invention relates to a computer readable storage medium having stored thereon computer readable instructions that, when executed on a computer, cause the computer to perform a method for enhancing directivity of a $1^{st}$ order Ambisonics signal having coefficients of $0^{th}$ order and $1^{st}$ order as defined in claim 1.

It is noted that Ambisonics signals of any given order generally include coefficients not only of the given order, but also coefficients of all lower orders, even if not explicitly mentioned herein. E.g., a $2^{nd}$ order HOA signal includes coefficients not only of $2^{nd}$ order, but also of $0^{th}$ order and $1^{st}$ order.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 *a*) the structure of a known DirAC-based B-format decoder.

DETAILED DESCRIPTION OF THE INVENTION

Figure 2:
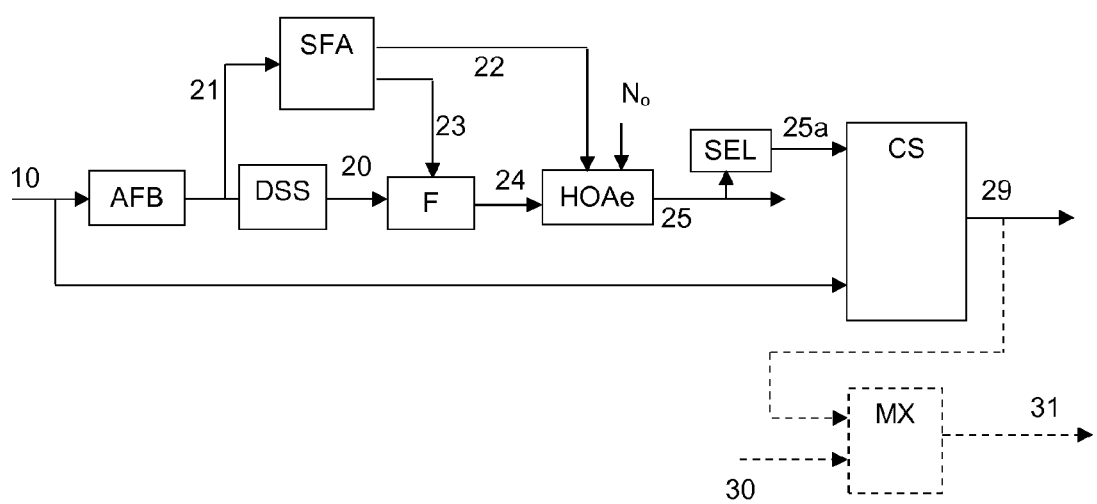
FIG. 2 the structure of an apparatus according to a general embodiment of the invention.

FIG. 2 shows the structure of an apparatus according to a general embodiment of the invention. A time domain $1^{st}$ order Ambisonics input signal 10 (such as a B-format signal) is filtered in an Analysis Filter Bank AFB, wherein four frequency domain channels 21 are obtained. These are a frequency domain representation of the input signal 10: one of the frequency domain channels represents $0^{th}$ order coefficients (i.e. the W-channel), and the other three frequency domain channels represent $1^{st}$ order coefficients (the X,Y,Z-channels).

A Direct Sound Separator unit DSS separates direct sound (i.e. directional sound) 20 in the four frequency domain channels 21 from diffuse sound. In an embodiment, the Direct Sound Separator unit DSS simply selects the W-channel and uses it as direct sound 20. Further, a Sound Field Analysis unit SFA performs a sound field analysis of the four frequency domain channels, obtaining source directions $\Theta,\Phi$ 22 and a diffuseness estimate $\Psi$ 23 for every frequency band of the frequency channels. In an embodiment, the Sound Field Analysis unit SFA includes a Direction of Arrival (DoA) analysis unit for obtaining the direction information 22.

The direct sound 20 obtained by the direct sound separator DSS is then filtered in a filter F, whereby diffuse components are damped and thus the directional sound is selectively (relatively) amplified. The filter F uses the diffuseness estimate $\Psi$ 23 for the selective amplification; in principle, it multiples the direct sound 20 with $\sqrt{2(1-\Psi(f))}$ to obtain selectively amplified direct sound 24. The selectively amplified direct sound 24 is then Ambisonics encoded in a HOA encoder HOAe, wherein a HOA signal 25 of a pre-defined order $N_0$ ($N_0 > 1$, i.e. at least $2^{nd}$ order) is obtained. The HOA encoder HOAe uses the source directions $\Theta,\Phi$ 22 for the encoding. It may use an Ambisonics format that has $0^{th}$ order and $1^{st}$ order coefficients according to the B-format. It may also use a different Ambisonics format instead. Different Ambisonics formats usually have a defined sequential order of coefficients that is different from the sequential order of the B-format, or a coefficient scaling that is different from the coefficient scaling of the B-format, or both.

A selector SEL selects defined portions of the HOA signal 25, and the selected portions 25*a* are then combined in a Combiner and Synthesis unit CS with the original B-format signal. The selected portions 25*a* are higher order portions of the HOA signal 25, i.e. portions (coefficients, in an embodiment) of at least $2^{nd}$ order. The Combiner and Synthesis unit CS provides on its output time domain signals 29 (in HOA format), which can be used to render speaker signals. The Combiner and Synthesis unit CS includes a synthesis filter SF for filtering Ambisonics formatted signals and obtaining the time domain signals.

FIG. 2 shows also an optional additional mixer unit MX, in which the obtained HOA output signal 29 can be mixed with another HOA input signal 30 of higher order. The other HOA input signal 30 can also have a different Ambisonics format than the input signal 10, due to a HOA format adapter HFA described below. The mixer MX generates a HOA signal 31 that includes a mixture of the obtained HOA output signal 29 (i.e. enhanced B-format input signal) and the HOA input signal 30.

Two basic types of embodiments of the Combiner and Synthesis unit CS are described in the following: In one type of embodiments, the Combiner and Synthesis unit CS combines the selected portions 25*a* with the original B-format signal 10 in the time domain. Therefore, it performs a synthesis of only the selected portions 25*a* into the time domain.

In the other type of embodiments, the Combiner and Synthesis unit CS combines the selected portions 25*a* with the original B-format signal 10 in the frequency domain, and performs a synthesis into the time domain afterwards.

Figure 3:
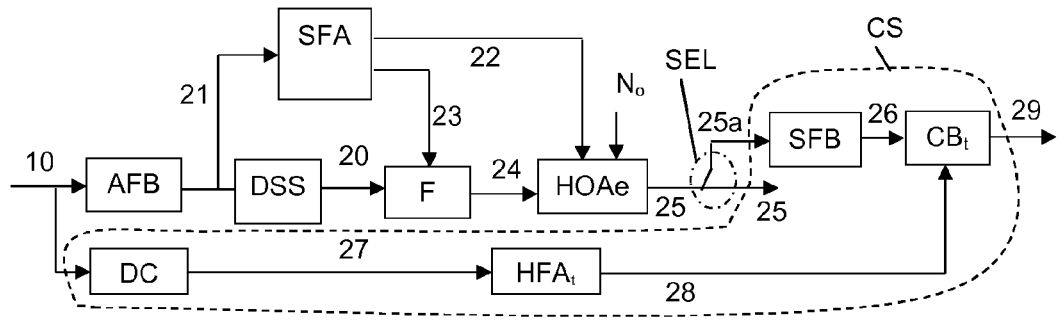
FIG. 3 the structure of an apparatus according to an embodiment that uses combining in the time domain.

FIG. 3 shows an embodiment of the first type. In this embodiment, the Combiner and Synthesis unit CS synthesizes only the selected higher order coefficients 25*a* of the HOA signal 25 in a Synthesis Filter Bank SFB to obtain a synthesized time domain signal 26. A time domain Combiner unit $CB_t$ combines the synthesized time domain signal 26 with the input signal in the time domain, to obtain the time domain output signal 29. In one embodiment, a time domain HOA Format Adapter unit $HFA_t$ adapts the format of the time domain input signal according to the format that the HOA encoder HOAe uses. This simplifies the combining of the obtained time domain HOA signal 28 with the synthesized time domain signal 26 in the time domain Combiner unit $CB_t$. In some embodiments, e.g. where the HOA encoder HOAe uses a format that is compatible with the HOA input signal, a HOA Format Adapter unit $HFA_t$ may not be required. The HOA Format Adapter unit $HFA_t$ may re-arrange and/or re-scale the coefficients of the HOA signal.

The Analysis Filter Bank AFB obtains different frequency bands, e.g. by performing an FFT (Fast Fourier Transform). This generates a time delay. In one embodiment, a Delay Compensation unit DC of the time domain input signal compensates filter bank delays, e.g. of the Analysis Filter Bank AFB, the selective amplification filter F etc. While in the depicted embodiment the delay compensation is made before HOA format adaptation HFA, it can in another embodiment be made after the HOA format adaptation. In yet another embodiment, the delay compensation is made in two steps, with one delay compensation unit before the format adaptation and another one thereafter.

Figure 4:
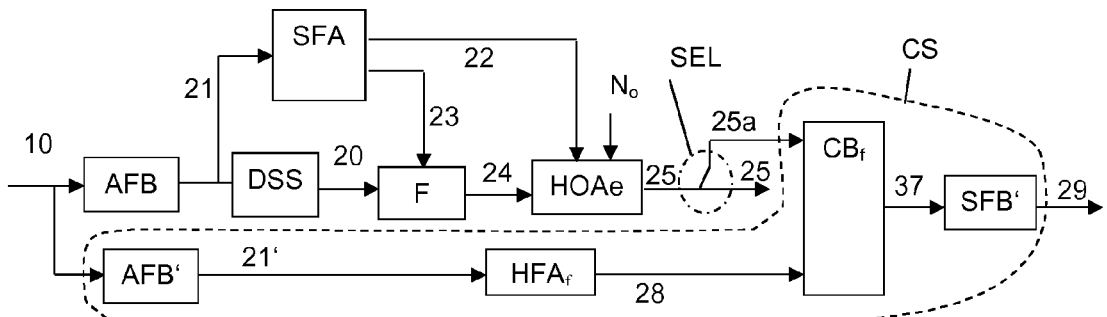
FIG. 4 the structure of an apparatus according to a first embodiment that uses combining in the frequency domain.
Figure 5:
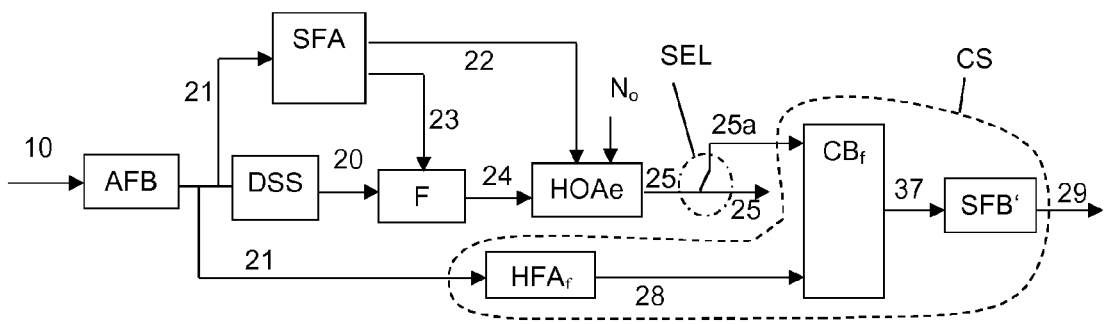
FIG. 5 the structure of an apparatus according to a second embodiment that uses combining in the frequency domain.

FIGS. 4 and 5 show embodiments that use the second type of the Combiner and Synthesis unit CS. In this embodiment, the Combiner and Synthesis unit CS receives frequency domain $0^{th}$ order and $1^{st}$ order Ambisonics coefficients of the input signal, as obtained from an Analysis Filter Bank. This may be a separate Analysis Filter Bank AFB', as in an embodiment shown in FIG. 4, or it may be the previously mentioned Analysis Filter Bank AFB, as in an embodiment shown in FIG. 5. In the latter case, the four frequency domain channels 21 provided by the Analysis Filter Bank AFB are directly input to the Combiner and Synthesis unit CS. A frequency domain Combiner unit $CB_f$ combines the selected higher order coefficients 25a of the HOA signal 25 with the $0^{th}$ order and $1^{st}$ order Ambisonics coefficients of the input signal in the frequency domain. A Synthesis Filter Bank SFB' synthesizes the combined Ambisonics coefficients, wherein the time domain output signal 29 is obtained. In one embodiment, an optional frequency domain HOA format adaptation $HFA_f$ is performed on the $0^{th}$ order and $1^{st}$ order Ambisonics coefficients of the input signal, before combining them with the selected higher order coefficients of the HOA signal 25. The HOA Format Adapter unit $HFA_f$ may re-arrange and/or re-scale the coefficients of a HOA signal. As mentioned above, the HOA Format Adapter unit $HFA_f$ may be not required in some embodiments. Further, as also mentioned above, Delay Compensation (not shown) may be used in one embodiment for any delay possible inserted in the processing chain (e.g. selective amplification filter F, HOA encoder HOAe). However, it will usually not be required, since the delay inserted by the Analysis Filter Bank AFB,AFB' needs not be compensated.

A time domain combiner $CB_t$ is a combiner that operates in the time domain, while a frequency domain combiner $CB_f$ is a combiner that operates in the frequency domain. Both types of combiner add the obtained coefficients of the selected portions 25a to the (possibly re-formatted) coefficients of the input signal 10.

Generally, an apparatus for enhancing directivity of a $1^{st}$ order Ambisonics time domain signal having coefficients of $0^{th}$ order and $1^{st}$ order includes an Analysis Filter Bank AFB for filtering the $1^{st}$ order Ambisonics signal, wherein four frequency domain channels 21 are obtained that are a frequency domain representation of the $1^{st}$ order Ambisonics signal, and wherein one frequency domain channel 20 of the frequency domain channels represents $0^{th}$ order coefficients and three of the frequency domain channels represent $1^{st}$ order coefficients, a Sound Field Analysis unit SFA for performing a sound field analysis of the four frequency domain channels, whereby source directions $\Theta,\Phi$ 22 and a diffuseness estimate $\Psi$ 23 are obtained, a selective amplification Filter F for filtering the frequency domain channel 20 that has $0^{th}$ order coefficients, wherein the diffuseness estimate $\Psi$ 23 is used and wherein a direct sound component 24 is obtained, a Higher Order Ambisonics encoder HOAe for encoding the direct sound component 24 in Ambisonics format with a pre-defined order of at least two, wherein said source directions $\Theta,\Phi$ 22 are used and wherein encoded direct sound 25 in Ambisonics format of the pre-defined order is obtained, the encoded direct sound in Ambisonics format having Ambisonics coefficients of at least $0^{th}$, $1^{st}$ and $2^{nd}$ order, a Selector SEL for selecting, from the obtained encoded direct sound 25 in Ambisonics format of the pre-defined order, Ambisonics coefficients 25a of at least $2^{nd}$ order, and a Combining and Synthesis unit CS for combining the selected Ambisonics coefficients of at least $2^{nd}$ order of the encoded direct sound 25a with the Ambisonics coefficients of the $1^{st}$ order Ambisonics input signal 10, wherein a time domain representation of an Ambisonics signal of at least $2^{nd}$ order 29 is obtained. It is noted that the selected Ambisonics coefficients 25a of at least $2^{nd}$ order do not include coefficients of $0^{th}$ order or $1^{st}$ order. That is, the Selector SEL omits the lower order coefficients.

In one embodiment, the present invention relates to a method for enhancing directivity of a $1^{st}$ order Ambisonics signal 10 (i.e. an Ambisonics signal with only $0^{th}$ and $1^{st}$ order coefficients). Generally, the method includes steps of generating, in a Sound Field Analysis unit SFA, a diffuseness estimate $\Psi$ 23 and direction information $\Theta,\Phi$ 22 from the $1^{st}$ order Ambisonics signal, separating and selectively amplifying direct sound 24 from the $1^{st}$ order Ambisonics signal, wherein a filter F for the selective amplifying uses the diffuseness estimate $\Psi$ 23, encoding the selectively amplified direct sound 24 in a HOA encoder HOAe, wherein the direction information $\Theta,\Phi$ 22 is used and a HOA signal 25 of at least $2^{nd}$ order is obtained, selecting a higher order portion of the HOA signal 25, wherein the selected higher order portion includes only coefficients of higher order than $1^{st}$ order (i.e. does not include $0^{th}$ order coefficients, and does not include $1^{st}$ order coefficients), and combining the selected higher order coefficients of the HOA signal 25 with the input $1^{st}$ order Ambisonics signal in a Combiner and Synthesis unit CS, wherein a time domain representation 29 of a Higher Order Ambisonics signal (i.e. an Ambisonics signal of at least $2^{nd}$ order) is obtained.

In one embodiment, the step of combining the selected higher order coefficients of the HOA signal 25 with the input $1^{st}$ order Ambisonics signal 10 includes receiving frequency domain $0^{th}$ order and $1^{st}$ order Ambisonics coefficients of the input signal from an Analysis Filter Bank AFB, combining the selected higher order (i.e. $2^{nd}$ order or higher) coefficients 25a of the HOA signal 25 with the $0^{th}$ order and $1^{st}$ order Ambisonics coefficients of the input signal in the frequency domain, and synthesizing the combined Ambisonics coefficients in a Synthesis Filter Bank SFB to obtain the time domain output signal 29.

In an embodiment, the method further includes a step of performing a frequency domain HOA format adaptation $HFA_f$ on the $0^{th}$ order and $1^{st}$ order Ambisonics coefficients of the input signal before combining them with the selected higher order coefficients of the HOA signal 25.

In another embodiment, the step of combining the selected higher order coefficients 25a of the HOA signal 25 with the input $1^{st}$ order Ambisonics signal 10 includes steps of synthesizing only the selected higher order coefficients 25a of the HOA signal 25 in a Synthesis Filter Bank SFB to obtain a synthesized time domain signal 26, and combining the obtained synthesized time domain signal with the input signal in the time domain to obtain the time domain output signal 29. In an embodiment, a time domain HOA format adaptation $HFA_t$ of the time domain input signal is performed before the combining. In a further embodiment, a Delay Compensation DC of the time domain input signal for compensating a filter bank delay is performed before the step of combining.

The higher order coefficients are obtained by filtering the $1^{st}$ order Ambisonics input signal 10 in an Analysis Filter Bank AFB, performing a Direction of Arrival (DoA) analysis of the filtered signal, whereby a diffuseness estimate $\Psi$ 23 and directions $\Theta,\Phi$ 22 are obtained, filtering the W-channel ($0^{th}$ order coefficients) using the diffuseness estimate $\Psi$ 23, whereby the direct sound S(f) 20 is separated, and encoding the direct sound S(f) 20 in Ambisonics format in a Higher Order Ambisonics encoder HOAe. From the resulting HOA signal 25, only the higher order coefficients are used, combined with the lower order coefficients of the input signal, and from the result an Ambisonics output signal 29 is synthesized.

Generally, the step of combining the selected higher order coefficients 25a of the HOA signal 25 with the input $1^{st}$ order Ambisonics signal 10 includes adding their respective coefficients, i.e. the output signal 29 includes all coefficients of the input signal 10 and additional coefficients, namely higher order coefficients of the selected portion 25a.

Figure 6:
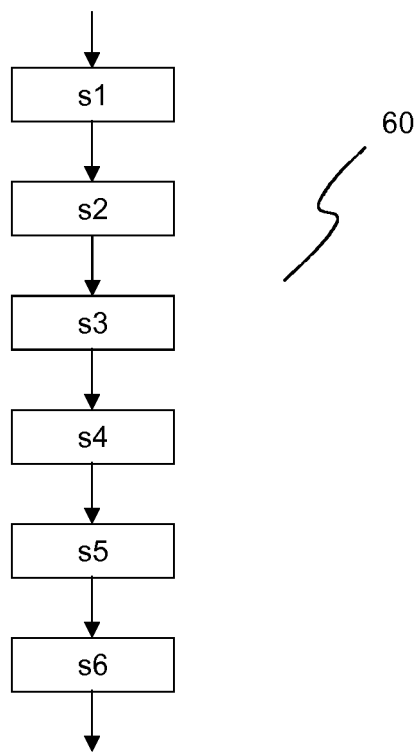
FIG. 6 a flow-chart of a method according to the invention.

FIG. 6 shows a flow-chart of a method according to one embodiment of the invention. The method 60 for enhancing directivity of an input signal 10 (a $1^{st}$ order Ambisonics signal having coefficients of $0^{th}$ order and $1^{st}$ order) includes steps of filtering s1 the input signal 10, wherein four frequency domain channels 21 are obtained, one of them being the Ambisonics W-channel 20, performing s2 a Sound Field Analysis SFA of the four frequency domain channels 21, whereby source directions 22 and a diffuseness estimate 23 are obtained, selecting and filtering s3 the frequency domain Ambisonics W-channel 20, wherein the diffuseness estimate 23 is used and wherein a direct sound component 24 of the input signal 10 is obtained, encoding s4 in a Higher Order Ambisonics encoder HOAe the direct sound component 24 in Ambisonics format with a pre-defined order $N_o$, wherein said source directions 22 are used and wherein encoded direct sound 25 in Ambisonics format of the pre-defined order $N_o$ is obtained, selecting s5, from the obtained encoded direct sound in Ambisonics format 25, defined portions 25a including Ambisonics coefficients of at least $2^{nd}$ order (i.e. $2^{nd}$ order or higher order, omitting lower orders), and combining s6 a signal representing the Ambisonics coefficients of at least $2^{nd}$ order of the selected portions of the encoded direct sound 25a with a signal representing the input signal 10, wherein an Ambisonics signal of at least $2^{nd}$ order 29 is obtained.

The four frequency domain channels 21 obtained in the filtering step s1 are a frequency domain representation of the $1^{st}$ order Ambisonics signal, wherein one first frequency domain channel (W-channel) 20 of the frequency domain channels 21 represents $0^{th}$ order coefficients, while the three remaining frequency domain channels 21 (X,Y,Z-channels) represent $1^{st}$ order coefficients.

In the encoding step s4, a Higher Order Ambisonics encoder HOAe encodes the direct sound component 24 in Ambisonics format with a pre-defined order $N_o$, using said source directions $\Theta,\Phi$ 22, wherein the pre-defined order $N_o$ is at least two and the encoded direct sound in Ambisonics format of the pre-defined order have Ambisonics coefficients of at least $2^{nd}$ order.

Figure 7:
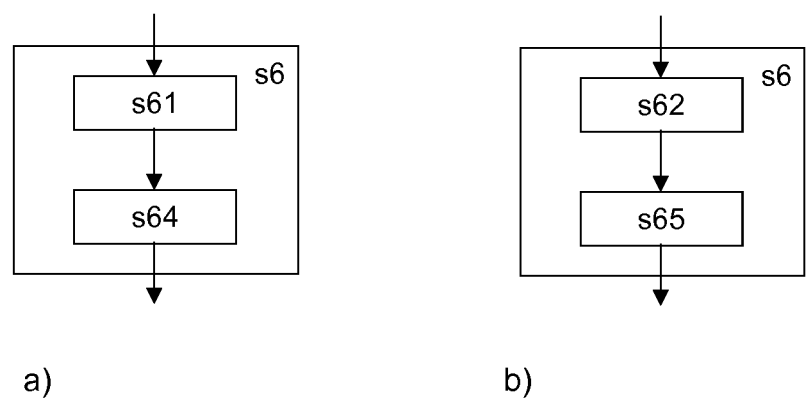
FIG. 7 a flow-chart of details of the combining step.

FIG. 7 a) shows an embodiment where the step of combining s6 uses the four frequency domain channels 21 as representation of the input signal 10 (corresponding to the apparatus shown in FIGS. 4,5). It includes steps of combining s61 in a frequency domain Combiner unit $CB_f$ the Ambisonics coefficients of the $1^{st}$ order Ambisonics signal 10, represented by coefficients of the four frequency domain channels 21,21',28, with the selected frequency coefficients 25a of the enhancement Higher Order Ambisonics signal 25 of at least $2^{nd}$ order, wherein a signal 37 is obtained that is a frequency domain representation of an Ambisonics signal of at least $2^{nd}$ order and that has enhanced directivity as compared to the $1^{st}$ order Ambisonics input signal 10, and filtering s64 in a Synthesis Filter Bank SFB' the obtained signal 37, wherein a time domain representation of an enhancement Higher Order Ambisonics signal is obtained that has coefficients of at least $2^{nd}$ order.

FIG. 7 b) shows an embodiment where the step of combining s6 uses the time domain coefficients of the input signal 10 (corresponding to the apparatus shown in FIG. 3). It includes steps of filtering s62 in a Synthesis Filter Bank SFB the selected Ambisonics coefficients of at least $2^{nd}$ order 25a from the encoded direct sound 25, wherein a time domain representation of an enhancement Higher Order Ambisonics signal 26 is obtained that has coefficients of at least $2^{nd}$ order, and combining s65 in a time domain combiner $CB_t$ the Ambisonics coefficients of the $1^{st}$ order Ambisonics signal 10 (or rather coefficients representing the Ambisonics coefficients of the $1^{st}$ order Ambisonics signal 10, since the actual HOA format may be adapted) with the time domain representation of said enhancement Higher Order Ambisonics signal of at least $2^{nd}$ order 26, wherein the time domain representation of an Ambisonics signal of at least $2^{nd}$ order 29 is obtained that has enhanced directivity as compared to the $1^{st}$ order Ambisonics signal 10.

The following description provides more details concerning Ambisonics. In the Ambisonics theory, a spatial audio scene is described by coefficients $A_n^m(k)$ of a Fourier-Bessel series. For a source-free volume, the sound pressure at an observation position $(r, \theta, \phi)$ can be described as a function of its spherical coordinates (radius r, inclination $\Theta$, azimuth $\Phi$ and spatial frequency $$k = \frac{\omega}{c} = \frac{2\pi f}{c}$$

by $$p(r, \theta, \phi, k) = \sum_{n=0}^{N} \sum_{m=-n}^{n} A_n^m(k) j_n(kr) Y_n^m(\theta, \phi) \qquad (1)$$

where $A_n^m(k)$ are the Ambisonic coefficients; $j_n(kr)$ are the Spherical-Bessel functions of first kind which describe the radial dependency; $Y_n^m(\theta,\phi)$ are the Spherical Harmonics (SH), which have real values in practice. They are responsible for the angular dependencies. n is the Ambisonics order index, and m the degree. Due to the nature of the Bessel function, which has only significant values for small kr, the summation series can be truncated at some order n=N with sufficient accuracy; for theoretical perfect reconstruction N→∞. More information and details may be reviewed in [11], [6], [7], [3], [13]. The Ambisonics coefficients $A_n^m$ form the Ambisonics signal; they have the physical unit of the sound pressure (1 Pa) and are time varying. The signal $A_0^0$ can be seen as a mono version of the Ambisonic recording. The actual values of the Ambisonics coefficients are determined by the definition of the SH, more accurate its normalization scheme. The number of coefficients $A_n^m$ in eq. (1) is given for 2D representations by O=2N+1, and for 3D representations by O=(N+1)$^2$.

In practice, Ambisonics uses real valued Spherical Harmonics (SH). A definition is provided below, since there are different formulations and kinds of normalization schemes for SH that affect encoding and decoding operations, i.e. the values of the Ambisonics coefficients. The formulation of real valued SH using unsigned expressions will be followed herein:

$$Y_n^m(\theta,\phi) = \tilde{N}_{n,m} P_{n,|m|}(\cos(\theta))\phi_m(\phi) \quad (2)$$

with $\tilde{N}_{n,m}$ the normalization factor (see Tab.1), which corresponds to the orthogonal relationship between $Y_n^m$ and $Y_{n'}^{m'*}$. That is, $$\int_{\Omega \in S_2} Y_n^m(\Omega) Y_{n'}^{m'}(\Omega)^* d\Omega = \frac{\tilde{N}_{n,m}}{\sqrt{\frac{(2-\delta_{0,m})(2n+1)(n-|m|)!}{4\pi(n+|m|)!}}}$$

$$\frac{\tilde{N}_{n',m'}}{\sqrt{\frac{(2-\delta_{0,m})(2n'+1)(n'-|m'|)!}{4\pi(n'+|m'|)!}}} \delta_{nn'}\delta_{mm'}$$

with Kronecker delta $\delta_{aa'}$ equals 1 for a=a', 0 else. In the following, use is made of the ortho-normalization scheme.

$P_{n,|m|}$ are the associated Legendre functions, which describe the dependency of the inclination $\cos(\theta)$. $P_{n,|m|}:[-1,1] \to \mathbb{R}$, n≥|m|≥0. $P_{n,|m|}$ can be expressed using the Rodrigues formula by eq. (3) (i.e., all definitions presented here do without the use of the Condon-Shortley phase, whose compensation for real valued variables can produce ambiguities), but more efficient methods for calculation for implementation exist.

$$P_{n,|m|}(x) = \frac{1}{2^n n!}(1-x^2)^{\frac{|m|}{2}} \frac{d^{n+|m|}}{dx^{n+|m|}}(x^2-1)^n \quad (3)$$

The dependency on the azimuth part $\phi$ is given by:

$$\phi_m(\phi) = \begin{cases} \cos(m\phi), & m > 0 \\ 1 & m = 0 \\ \sin(|m|\phi) & m < 0 \end{cases} \quad (4)$$

Tab.1 shows common normalization schemes used within Ambisonics. $\delta_{0,m}$, takes a value of 1 for m=0 and 0 else. Naming convention SN3D, N3D is taken from [3].

TABLE 1

Common normalization schemes used within Ambisonics
$\tilde{N}_{n,m}$ Normalization schemes for real SH

| Not Normalized | Schmidt Semi Normalized, SN3D | 4π Normalized, N3D, Geodesy 4π | Ortho-Normalized |
|---|---|---|---|
| $\sqrt{2-\delta_{0,m}}$ | $\sqrt{(2-\delta_{0,m})\frac{(n-|m|)!}{(n+|m|)!}}$ | $\sqrt{(2-\delta_{0,m})\frac{(2n+1)(n-|m|)!}{(n+|m|)!}}$ | $\sqrt{(2-\delta_{0,m})\frac{(2n+1)(n-|m|)!}{4\pi(n+|m|)!}}$ |

Signals recorded by SoundField™ like microphones are represented using the B-Format. The technology is described in [2]. There are four B-Format signals: The W signal carries a signal proportional to the sound pressure recorded by an omni-directional microphone, but is scaled by a factor of $1/\sqrt{2}$. The X,Y,Z signals carry signals proportional to the pressure gradients in the three Cartesian directions. The four B-Format coefficients W,X,Y,Z are related to first order HOA coefficients using N3D normalization schemes [3], [4] by $W = A_{0\ N3D}^0/\sqrt{2}$, $X = A_{1\ N3D}^1/\sqrt{3}$, $Y = A_{1\ N3D}^{-1}/\sqrt{3}$, $Z = A_{1\ N3D}^0/\sqrt{3}$ and to HOA coefficients using SN3D normalization by $W = A_{0\ N3D}^0/\sqrt{2}$, $X = A_{1\ SN3D}^1$, $Y = A_{1\ SN3D}^{-1}$, $Z = A_{1\ SN3D}^0$. Further, the B-Format assumes a plane wave encoding model where the factor $i^n$ is omitted within coefficient representation.

HOA signals can also be represented by plane waves. The sound pressure of a plane wave is given by [11]:

$$p(r, \theta, \phi, k) = \sum_{n=0}^{N} \sum_{m=-n}^{n} i^n P_{S_0} Y_n^m(\Theta_s, \phi_s)^* j_n(kr) Y_n^m(\theta, \phi) \quad (5)$$

using the N3D normalization scheme for spherical harmonics, and strictly $A_n^m$ would become:

$$A_n^m(f) = 4\pi i^n P_{S_0}(f) Y_n^m(\Theta(f)_s, \phi(f)_s)^* \quad (6)$$

where $P_{S_0}(f)$ is the sound pressure at the coordinate system's origin at frequency f. $\Theta(f)_s$, $\phi(f)_s$ are the directions (inclination, azimuth) to the source (DoA), and * indicates a conjugate complex. Many Ambisonics formats and systems, including the B-Format and the SoundField™ microphone system, assume a plane wave encoding and decoding model and the factor $i^n$ is omitted. Then $A_n^m$ becomes:

$$A_n^m(f) = 4\pi P_{S_0}(f) Y_n^m(\Theta_s(f), \phi_s(f))^* \quad (7)$$

Figure 1:
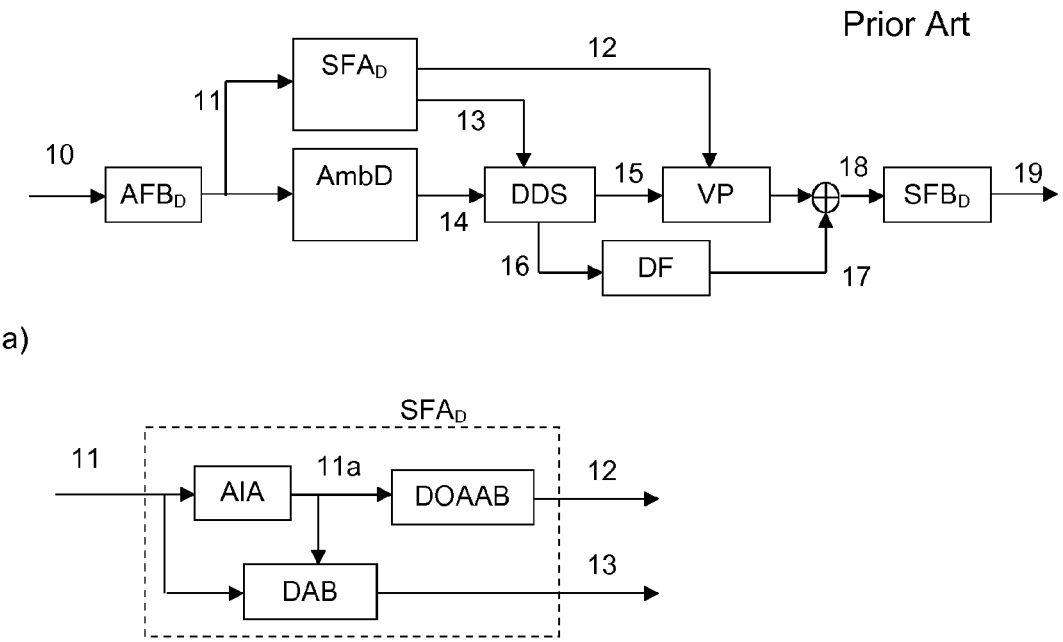
FIG. 1 *b*) the general structure of a known Sound Field Analysis block.

As mentioned above, FIG. 1b) depicts building blocks of a sound field analysis block $SFA_D$. It is in principle like the Sound Field Analysis block SFA of the present invention, except that a generalized time-frequency consideration is used here, which allows using an arbitrary time window. I.e.

the Sound Field Analysis is simplified to different temporal normalizations. This generalization allows using an arbitrary complex filter bank. Another generalization taken here is that the active sound field is assembled from a superposition of plane waves. All sound field parameters are functions of frequency, and they can be calculated for each center frequency of filter bank band k. The dependency of $f_k$ from k is omitted in the following detail description.

Active Intensity is described next.

The active Intensity $I_a(f)$ is defined according to (see [5]):

$$I_a = \text{Re}\{P(f)^* U(f)\} \tag{8}$$

The unit of the active Intensity is W/m²=N/(ms). P(f)* is the conjugate complex sound pressure (in Pascal=1 N/m²) and U(f) is particle velocity in m/s a vector in three Cartesian dimensions. Re{•} denotes the real part. Other formulations of the active intensity use an additional factor of ½, as in [11], which would then lead to an additional factor for eq.(13). B-Format signal W is proportional to the sound pressure signal P(f), and the signals $X(f)=[X(f),Y(f),Z(f)]^T$ are proportional to the sound velocity U.

$$U(f) = \frac{1}{Z_0}(X(f)e_x + Y(f)e_y + Z(f)e_z) \tag{9}$$

where $e_i$ are the unit vectors of the Cartesian coordinate axes and $e_u$ of the unit vector direction of the propagating plane wave. $Z_0$ is the characteristic impedance (the product of speed of sound and the density of air $Z_0=\rho_0 c$). Then the active Intensity $I_a$ can be expressed using B-Format signals as (see [5]):

$$I_a(f) = \frac{\sqrt{2}}{Z_0} \text{Re}\{W(f) * X(f)\} \tag{10}$$

where the factor $\sqrt{2}$ respects the scaling of the W coefficient within the B Format; * denotes conjugate complex. $I_a(f)$, $X(f)$ are a vector functions of frequency in Cartesian coordinates.

Direction of Arrival is described next.

The unit vector of the active Intensity $e_I(f)=[e_{Ix}(f),e_{Iy}(f),e_{Iz}(f)]^T$ is given by: $e_I(f)=I_a(f)/\|I_a(f)\|$ The azimuth angle of DoA is given in rad by:

$$\phi(f) = \text{atan2}\left(\frac{e_{Iy}(f)}{e_{Ix}(f)}\right) \tag{11}$$

where $I_{a,i}(f)$ are the Cartesian components of $I_a(f)$ and a tan 2 is the four-quadrant inverse tangent. The elevation angle $\Theta(f)$ can be calculated by:

$$\theta(f) = \text{atan2}\left(\frac{\sqrt{e_{Ix}(f)^2 + e_{Iy}(f)^2}}{e_{Iz}(f)}\right) \tag{12}$$

Diffuseness is described next.

The energy density, i.e. the sound energy per unit volume (in physical units N/m²=kg m/s² 1/m²), of the sound field is described by [5]:

$$E(f) = \frac{\rho_0}{2}(Z_0^{-2}|P(f)|^2 + \|U(f)\|^2) \tag{13}$$

where $\|U\|$ describes the matrix norm 2, the Euclidean length of vectors.

For Ambisonics signals, 1$^{st}$ order/B-Format becomes:

$$E(f) = \frac{\rho_0}{Z_0}\left(|W(f)|^2 + \frac{\|X(f)\|^2}{2}\right) \tag{14}$$

In the following, dependency of frequency in the notation is dropped for better readability. The Diffuseness estimation $\Psi$ is defined as [5]:

$$\Psi = \frac{\mathbb{E}(E) - \|\mathbb{E}(I_a)\|/c}{\mathbb{E}(E)} = 1 - \frac{\|\mathbb{E}(I_a)\|}{c\mathbb{E}(E)} \tag{15}$$

$\mathbb{E}$ is the expected value operator which can be implemented using temporal averaging realized by a windowed average or a first order by an IIR filter. $\Psi$ expresses the contribution of the non-active energy parts of the sound field. A value of 1 describes a completely diffuse sound field (no kinetic energy contribution), and a value of 0 a fully active sound field. Using B-format signals, the Diffuseness can be expressed as:

$$\Psi = 1 - \frac{\sqrt{2}\|\mathbb{E}(\text{Re}\{W*X\})\|}{\mathbb{E}\left(|W|^2 + \frac{\|X\|^2}{2}\right)} \tag{16}$$

An alternative realization of the Diffuseness estimate [1] is given by $$\Psi = \sqrt{1 - \frac{\|\mathbb{E}(I_a)\|}{\mathbb{E}(\|I_a\|)}} \tag{17}$$

Average filtering is described next.

The Diffuseness estimate and the DoA directions require temporal averaging. To approximate the expectation $y \cong \mathbb{E}(x)$, a smoothing filter output is defined by [12]:

$$y(n,k)=(1-g)x(n,k)+gy(n-1,k) \tag{18}$$

where x(n, k) is the input and y(n−1, k) the sample (transform block) delayed output in filter band k. The filter parameter g is given by:

$$g = \exp\left(-\frac{1}{f_c \tau}\right)$$

where $f_c$ is the sample rate of the sub-sampling filter bank. For block-based filter banks with 50% overlapping windows, $f_c$ becomes $$f_c = \frac{f_s}{N_{hop}},$$

with hop size $N_{hop}$ being half the window size for this 50% overlap case. The time constant τ determines the characteristic of the averager. A small value is suitable when fast variations of the input signals need to be followed, a large value is suited for a long-term average.

Alternative realizations exist, for example (see [10]):

$$y(k,n)=ax(k,n)+(1-a)y(k,n-1) \quad (19)$$

with $$a = \frac{N_{hop}}{\tau f_s} \text{ and } \tau \geq \frac{N_{hop}}{f_s}.$$

Here τ is seen in absolute relation to $f_s$.

Adaptive filter with block dependent switch parameter cc and two time constants $\tau_{max}$, $\tau_{min}$ can be used for the time constant:

$$\tau = \tau_{min} + \frac{cc_{max} - cc}{cc_{max}} (\tau_{max} - \tau_{min}) \quad (20)$$

In most cases, any $1^{st}$ order Ambisonics recording will be a B-Format signal. A method according to the present invention derives higher order Ambisonics coefficients for an existing $1^{st}$ order Ambisonics recording, while maintaining first order coefficient information. A Direction of Arrival (DoA) analysis is performed to derive the strongest directions over frequency. The W-channel represents a mono mix of all of these signals. The W-channel is filtered such that the diffuse parts are removed over frequency. Thus, the filtered W-channel becomes an estimate of the direct sounds over frequency. The DoA directions are used for Ambisonics encoding of the filtered W-channel signal to form a new HOA signal of a pre-assigned Ambisonics order N_order>1, with $O=(N_{order}+1)^2$ for 3D and $O=(2N_{order}+1)$ coefficients for 2D realizations. The four coefficients of the B-Format recording (i.e. $1^{st}$ order signals) are format converted into the same format as the new Ambisonics signals, if necessary, and combined with the new coefficients to form the output signal. The resulting output HOA signal coefficients $C_n^m$ are compiled out of the converted B-Format coefficients of zero and first order components and from the new HOA coefficients of higher order components.

Processing or parts of the processing are applied in a filter bank frequency domain of the analysis filter bank.

One embodiment uses a FFT based analysis filter bank. A 50% overlapping sine window is applied to 960 samples, or alternatively to e.g. 640 or 512 samples. Zero padding to left and right is used to obtain a 1024 sample FFT length. The inverse filter bank (synthesis filter bank) uses windowing and overlay add to restore a block of 480 (320, 256) samples. An alternatively usable filter bank, which uses filter bandwidths that better match human perception, is described in ISO/IEC 23003/2007/2010 (MPEG Surround, SAOC). When using a FFT filter bank, two or more filter bands can be combined to better adapt to human perception especially for high frequencies. In one embodiment, a bandwidth of approximately a quarter of a bark is used with a granularity of one FFT-filter band, and mean values of active Intensity and energy over the combined bands are used. In various embodiments, the sound field parameters "active Intensity" and/or "energy density" are used to derive DoA angles and the Diffuseness estimate.

In one embodiment, special smoothing filters according to eq.(18) for DoA directions and Diffuseness estimates are used; then, smoothing of the Diffuseness estimate is realized as follows (the frequency band dependency is omitted for clarity):

The Diffuseness estimate according to eq.(15) is given by $$\Psi = 1 - \frac{\|\mathbb{E}(I_a)\|}{c\mathbb{E}(E)}.$$

The smoothing filters of the enumerator $\tilde{I}_a \cong \mathbb{E}(I_a) = [\mathbb{E}(I_{ax}), \mathbb{E}(I_{ay}), \mathbb{E}(I_{az})]^T$ are realized by first order IIR filters using the same time constants for the three components. Further, the filters have double coefficients characterized by a small $\tau_{min}$ and a large time constant $\tau_{max}$. Switching between time constants is performed depending on the change of $\|I_a\|$ and an additional state counter cc, where $I_a(n)$ is the filter input and $\tilde{I}_a(n-1)$ is the filter output of previous operation.

If cc==0 and $\|I_a(n)\| \leq \|\tilde{I}_a(n-1)+\epsilon_1\|$ the coefficient with the large time constant $\tau_{max}$ is used.

If $\|I_a(n)\| > \|\tilde{I}_a(n-1)+\epsilon_1\|$, the coefficient characterized by the small time constant $\tau_{min}$ is used and cc is set to $cc_{max}$ larger 1 (e.g. $cc_{max}=10$).

If cc>0 and $\|I_a(n)\| \leq \|\tilde{I}_a(n-1)+\epsilon_1\|$, then a time constant $$\tau = \tau_{min} + \frac{cc_{max} - cc}{cc_{max}} (\tau_{max} - \tau_{min})$$

is used and cc is decremented afterwards (block processing) as long as it is unequal zero.

$\epsilon_1$ is a positive constant. Smoothing of energy E is performed in an analogous way, using a separate filter but the same adaptive filter structure. It is characterized by $\tau_{max}$, $\tau_{min}$ and an own cc state counter, where changes of $|E(n)|$ are used to switch between large, small and interpolated time constants.

$\phi(f)$, $\Theta(f)$ are derived from the unit vector of the active Intensity $e_I(f)=I_a(f)/\|I_a(f)\|$ by creating two complex signals:

$$a_1 = e_{lx} + ie_{ly} \quad (21)$$

and $$a_2 = \sqrt{e_{lx}^2 e_{ly}^2} + ie_{lz} \quad (22)$$

where $i=\sqrt{-1}$ and $e_{lx}$, $e_{ly}$, $e_{lz}$ are the Cartesian components of the unit vector of the active Intensity. The signals $a_1$, $a_2$ are filtered using an adaptive IIR first order filter per sub-band according to eq.(18):

$$b_1(n) = (1-g(\Psi))a_1(n) + g(\Psi)b_1(n-1) \quad (23)$$

and analogous for $b_2(n)$ using input $a_2(n)$ and the same filter parameters $g(\Psi)$ which depends on the Diffuseness $\Psi$. The dependency may be linear: $g(\Psi)=(g_{max}-g_{max})\Psi+g_{min}$ with $g_{min}$ close to zero and $g_{max} \leq 1$.

The directional signals $\phi$, $\Theta$ can be calculated from the filter outputs as follows:

$$\phi = \text{atan2}\left(\frac{\text{Im}\{b_1\}}{\text{Re}\{b_1\}}\right) \quad (24)$$

$$\theta = \text{atan2}\left(\frac{\text{Re}\{b_2\}}{\text{Im}\{b_2\}}\right) \quad (25)$$

The embodiments described above with reference to FIGS. 2-5 use four analysis filters for the first order coefficients denoted by W,X,Y,Z in the B-format case. A DoA and Diffuseness estimation analysis is performed using the above described adaptive smoothing filters in K frequency bands with center frequency $f_k$. The W coefficient signal is multiplied with $\sqrt{2(1-\Psi(f_k))}$ in the case of B-Format, and in case of other normalized first order signals with $\sqrt{(1-\Psi(f_k))}$ in each frequency band to realize signal S. The DoA directions are used to Ambisonics encode signal S in frequency bands to form a new HOA signal of a pre-assigned Ambisonics order N_order>1 with $O=(N_{order}+1)^2$ for 3D and $O=(2N_{order}+1)$ coefficients for 2D realizations. The O new Ambisonics signals are denoted by $B_n^m$. In one embodiment, the HOA encoder uses N3d or ortho-normalized spherical harmonics omitting the factor $i^n$. A plane wave encoding scheme is used:

$$B(f_k) = \Xi(f_k) S(f_k) \qquad (26)$$

where $B(f_k)$ is a vector for each frequency band k with mid center $f_k$ holding the O Ambisonics coefficients $B(f_k)=[B_0^0(f_k), B_1^{-1}(f_k), B_1^0(f_k), B_1^1(f_k), B_2^{-2}(f_k), \ldots]^T$ and $\Xi$ is the Mode Vector of size O×1 holding the directional spherical harmonics:

$$\Xi(f_k)=[Y_0^0(\Theta_s(f_k),\phi_s(f_k))^*, Y_1^{-1}(\Theta_s(f_k),\phi_s(f_k))^*, Y_1^0(\Theta_s(f_k),\phi_s(f_k))^*, \ldots]^T.$$

The four coefficients of the B-Format input signal, e.g. a recording, are format converted into the same format as the new Ambisonics signals generated by the HOA encoder HOAe. This can imply adaptation to different normalization of spherical harmonics as well as optional consideration of the factor $i^n$, which is sometimes included within Ambisonics coefficients, and a 3D-to-2D conversion for adapting to 2D spherical harmonics or vice versa. The converted and resorted B-Format coefficients are denoted $A_0^0, A_1^{-1}, A_1^0, A_1^1$ with relationship: $[W,Y,Z,X] \to [A_0^0, A_1^{-1}, A_1^0, A_1^1]$ and for 2D: $[W,Y,X] \to [A_0^0, A_1^{-1}, A_1^1]$.

The resulting HOA signal $C_n^m$ 29 is compiled out of the converted B-format signals and the new HOA coefficients $B_n^m$, with the zero and first order components omitted: $C_n^m$: $[A_0^0, A_1^{-1}, A_1^0, A_1^1, B_2^{-2}, B_2^{-1}, B_2^0, B_2^1, B_2^2, \ldots]$. The resulting HOA signal $C_n^m$ 29 has $O=(N_{order}+1)^2$ components for 3D realizations, or $O=(2N_{order}+1)$ components for 2D realizations with $C_n^m$: $[A_0^0, A_1^{-1}, A_1^1, B_2^{-2}, B_2^2, \ldots]$. This procedure can be regarded as an order upmix for Ambisonics signals.

The embodiment described above with respect to FIG. 3 combines original coefficients with new coefficients in the time domain and uses O-4 synthesis filters (note that the letter "O" is meant, not zero) and an additional delay to compensate for the filter bank delay. The embodiments shown in FIG. 4-5 combine in the filter bank domain and make use of O (not zero) synthesis filters.

After an order upmix according to the present invention, the new signals $C_n^m$ can be used for several purposes, e.g. mixing with other Ambisonics content of N_order to form signal $D_n^m$, decoding of $C_n^m$ or $D_n^m$ for replay using L speakers using a N_order Ambisonics decoder, transmitting and/or storing of $C_n^m$ or $D_n^m$ in a database, etc. In some cases, e.g. transmitting and/or storing, metadata can be used for indicating the origin and performed processing of the Ambisonics signal.

While the invention is suitable for enhancing the directivity of any lower order Ambisonics signal to a respective higher order Ambisonics signal, exemplary embodiments described herein use only $1^{st}$ order (B-format) signals for being enhanced e.g. to $2^{nd}$ order signals. However, the same principle can be applied to enhance an Ambisonics signal of given order to any higher order, e.g. a $2^{nd}$ order signal to a $3^{rd}$ order signal, a $1^{st}$ order signal to a $4^{th}$ order signal etc. Generally, it makes no sense to generate coefficients of higher order than $4^{th}$ order.

One advantage of the invention is that it allows mixing B-format signals (such as e.g. $1^{st}$ order microphone recordings) with higher order content to enhance the spatial reproduction accuracy when decoding the mixture.

While various omissions, substitutions and changes in the apparatus and method described, in the form and details of the devices disclosed, and in their operation, may be made by those skilled in the art, it is expressly intended that all combinations of those elements that perform substantially the same function in substantially the same way to achieve the same results are within the scope of the invention. It will be understood that the present invention has been described by way of example, and each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

CITED REFERENCES

[1] Jukka Ahonen and Ville Pulkki. Diffuseness estimation using temporal variation of intensity vectors. 2009 *IEEE Workshop on Applications of Signal Processing to Audio and Acoustics*, Oct. 18-21, 2009, New Paltz, N.Y.

[2] Peter G. Craven and Michael A. Gerzon. Coincident microphone simulation covering three dimensional space and yielding various directional outputs, 1975.

[3] Jérôme Daniel. Représentation de champs acoustiques, application à la transmission et à la reproduction de scènes sonores complexes dans un contexte multimédia. PhD thesis, Universite Paris 6, 2001.

[4] Dave Malham. *Space in Music—Music in Space*. PhD thesis, University of York, April 2003.

[5] Juha Merimaa. *Analysis, Synthesis, and Perception of Spatial Sound—Binaural Localization Modeling and Multichannel Loudspeaker Reproduction*. PhD thesis, Helsinki University of Technology, 2006.

[6] M. A. Poletti. Three-dimensional surround sound systems based on spherical harmonics. *J. Audio Eng. Soc.*, 53(11):1004-1025, November 2005.

[7] Mark Poletti. Unified description of ambisonics using real and complex spherical harmonics. In *Proceedings of the Ambisonics Symposium* 2009, Graz. Austria, June 2009.

[8] Ville Pulkki. Virtual sound source positioning using vector base amplitude panning. *J. Audio Eng. Soc.*, 45(6): 456-466, June 1997.

[9] Ville Pulkki. Spatial Sound Reproduction with Directional Audio Coding. *J. Audio Eng. Soc.*, 55(6):503-516, June 2007.

[10] Oliver Thiergart, Giovanni Del Galdo, Magdalena Prus, and Fabian Kuech. Three-dimensional sound field analysis with directional audio coding based on signal adaptive parameter estimators. In *AES 40 TH INTERNATIONAL CONFERENCE*, Tokyo, Japan, October 8â€"10, 2010.

[11] Earl G. Williams. *Fourier Acoustics*. Academic Press, 1999.

[12] Udo Zölzer, editor. *DAFX—Digital Audio Effects*. John Wiley & Sons, 2002.

[13] Franz Zotter. *Analysis and Synthesis of Sound Radiation with Spherical Arrays*. PhD thesis, Institute of Electronic Music and Acoustics (IEM), 2009.

The invention claimed is:

1. A method for enhancing directivity of an input signal being a $1^{st}$ order Ambisonics signal and having coefficients of $0^{th}$ order and $1^{st}$ order, the method including:
   filtering the input signal in an Analysis Filter bank, wherein four frequency domain channels are obtained that are a frequency domain representation of the $1^{st}$ order Ambisonics signal, and wherein one first frequency domain channel of the frequency domain channels represents $0^{th}$ order coefficients and three remaining frequency domain channels represent $1^{st}$ order coefficients;
   performing a Sound Field Analysis of the four frequency domain channels, whereby source directions and a diffuseness estimate are obtained;
   filtering in a filter the first frequency domain channel that has $0^{th}$ order coefficients to determine a direct sound based on the diffuseness estimate;
   encoding in a Higher Order Ambisonics encoder the direct sound component based on the source directions, wherein the direct sound component is encoded in Ambisonics format with a pre-defined order that has a value of at least two, wherein encoded direct sound in Ambisonics format of the pre-defined order is obtained, and wherein the encoded direct sound in Ambisonics format of the pre-defined order including Ambisonics coefficients of an order higher than $1^{st}$ order;
   selecting from the encoded direct sound in the Ambisonics format of the pre-defined order only Ambisonics coefficients of $2^{nd}$ order or higher order, wherein coefficients of $1^{st}$ order and $0^{th}$ order are omitted; and
   combining in a Combining and Synthesis unit a signal representing the selected Ambisonics coefficients of $2^{nd}$ order or higher order from the encoded direct sound with the input signal, wherein an enhanced directivity Ambisonics signal of at least $2^{nd}$ order is obtained.

2. The method according to claim 1, wherein the combining the selected Ambisonics coefficients of $2^{nd}$ order or higher order from the encoded direct sound with the input signal includes:
   combining in a frequency domain Combiner unit Ambisonics coefficients of the four frequency domain channels with the selected frequency coefficients of the selected Ambisonics coefficients of $2^{nd}$ order or higher order from the encoded direct sound, wherein a signal is obtained that is a frequency domain representation of an Ambisonics signal of at least $2^{nd}$ order, and
   filtering in a Synthesis Filter Bank the obtained signal to determine a time domain representation of an enhancement Higher Order Ambisonics signal that has coefficients of at least $2^{nd}$ order.

3. The method according to claim 1, wherein the combining the selected Ambisonics coefficients of $2^{nd}$ order or higher order from the encoded direct sound with the input signal includes:
   filtering in a synthesis filter bank the selected Ambisonics coefficients of $2^{nd}$ order or higher order from the encoded direct sound, wherein a time domain representation of an enhancement Higher Order Ambisonics signal is obtained that includes coefficients of $2^{nd}$ order or higher order;
   combining in a time domain combiner Ambisonics coefficients representative of the input signal with the time domain representation of said enhancement Higher Order Ambisonics signal of $2^{nd}$ order or higher order, wherein a time domain representation of an Ambisonics signal of at least $2^{nd}$ order is obtained that has enhanced directivity as compared to the input signal.

4. The method according to claim 1, wherein in said encoding the direct sound component in Ambisonics format with pre-defined order, the Higher Order Ambisonics encoder uses B-format.

5. The method according to claim 1, wherein in the encoding the direct sound component in Ambisonics format with pre-defined order, the Higher Order Ambisonics encoder uses an Ambisonics format other than B-format, further including:
   re-formatting in a HOA format adaptation unit, before said combining, the input signal according to the Ambisonics format other than B-format to obtain re-formatted Ambisonics coefficients of the input signal, and wherein, in said combining, the combiner combines the re-formatted Ambisonics coefficients of the input signal with the time domain representation of the enhancement Higher Order Ambisonics signal of $2^{nd}$ order or higher order.

6. The method according to claim 1, wherein the performing a Sound Field Analysis of the four frequency domain channels includes:
   performing an active Intensity analysis of the four frequency domain channels, wherein a value representing active intensity is obtained;
   performing a diffuseness analysis of the four frequency domain channels, wherein said diffuseness estimate is obtained; and
   performing a Direction-of-Arrival analysis of the value representing active intensity to obtain the source directions.

7. The method according to claim 1, further including mixing the enhanced Ambisonics signal of at least $2^{nd}$ order with a further HOA input signal of a higher order or a different Ambisonics format, wherein a HOA signal that includes a mixture of the input signal and said further HOA input signal is obtained.

8. The method according to claim 1, wherein the resulting HOA signal has $O=(N_{order}+1)^2$ components for 3D realizations and $O=(2 N_{order}+1)$ components for 2D realizations, wherein $N_{order}$ is the order of the HOA encoder, and the resulting HOA signal has $C_n^m$ coefficients according to $C_n^m$: $[A_0^0, A_1^{-1}, A_1^0, A_1^1, B_2^{-2}, B_2^{-1}, B_2^0, B_2^1, B_2^2, \ldots ']$, wherein the $A_i^j$ are coefficients of the input signal and the $B_i^j$ are the selected HOA coefficients from the encoded direct sound.

9. An apparatus for enhancing directivity of an input signal being a $1^{st}$ order Ambisonics signal and having coefficients of $0^{th}$ order and $1^{st}$ order, the apparatus including:
   an Analysis Filter bank for filtering the input signal, wherein four frequency domain channels are obtained that are a frequency domain representation of the $1^{st}$ order Ambisonics signal, and wherein one frequency domain channel of the frequency domain channels represents $0^{th}$ order coefficients and three of the frequency domain channels represent $1^{st}$ order coefficients;
   a Sound Field Analysis unit for performing a sound field analysis of the four frequency domain channels, whereby source directions and a diffuseness estimate are obtained;

a Filter for filtering the frequency domain channel that has $0^{th}$ order coefficients to determine a direct sound based on the diffuseness estimate;

a Higher Order Ambisonics encoder for encoding the direct sound component based on the source directions, wherein the direct sound component is encoded in Ambisonics format with a pre-defined order that has a value of at least two, wherein encoded direct sound in Ambisonics format of the pre-defined order is obtained, and wherein the encoded direct sound in Ambisonics format of the pre-defined order including Ambisonics coefficients of an order higher than $1^{st}$ order;

a Selector for selecting, from the encoded direct sound in the Ambisonics format of the pre-defined order only Ambisonics coefficients of $2^{nd}$ order or higher order, wherein coefficients of $1^{st}$ order and $0^{th}$ order are omitted; and a Combining and Synthesis unit for combining a signal representing the selected Ambisonics coefficients of $2^{nd}$ order or higher order from the encoded direct sound with the input signal, wherein an enhanced directivity Ambisonics signal of at least $2^{nd}$ order is obtained.

10. The apparatus according to claim 9, wherein the Combining and Synthesis unit includes:
a frequency domain Combiner unit for combining Ambisonics coefficients of the four frequency domain channels with the selected frequency coefficients of the selected Ambisonics coefficients of $2^{nd}$ order or higher order from the encoded direct sound, wherein a signal is obtained that is a frequency domain representation of an Ambisonics signal of at least $2^{nd}$ order, and
a Synthesis Filter Bank for filtering the obtained signal to determine a time domain representation of an enhancement Higher Order Ambisonics signal that has coefficients of at least $2^{nd}$ order.

11. The apparatus according to claim 9, wherein the Combining and Synthesis unit includes:
a Synthesis Filter Bank for filtering the selected Ambisonics coefficients of $2^{nd}$ order or higher order from the encoded direct sound, wherein a time domain representation of an enhancement Higher Order Ambisonics signal is obtained that includes coefficients of $2^{nd}$ order or higher order; and
a time domain Combiner unit for combining Ambisonics coefficients representative of the input signal with the time domain representation of said enhancement Higher Order Ambisonics signal of $2^{nd}$ order or higher order, wherein a time domain representation of an Ambisonics signal of at least $2^{nd}$ order is obtained that has enhanced directivity as compared to the input signal.

12. The apparatus according to claim 9, wherein said Higher Order Ambisonics encoder for encoding the direct sound component in Ambisonics format with pre-defined order uses B-format.

13. The apparatus according to claim 9, wherein the Higher Order Ambisonics encoder, when encoding the direct sound component in Ambisonics format with pre-defined order, uses an Ambisonics format other than B-format, further including:
a HOA format adaptation unit for re-formatting the input signal according to the Ambisonics format other than B-format to obtain re-formatted Ambisonics coefficients of the input signal, and wherein the Combiner unit combines the re-formatted Ambisonics coefficients of the input signal with the time domain representation of the enhancement Higher Order Ambisonics signal of $2^{nd}$ order or higher order.

14. The apparatus according to claim 9, wherein the Sound Field Analysis unit includes:
an Active Intensity Analysis block for performing an active Intensity analysis of the four frequency domain channels, wherein a value representing active intensity is obtained;
a diffuseness analysis block for performing a diffuseness analysis of the four frequency domain channels, wherein said diffuseness estimate is obtained; and
a Direction-of-Arrival Analysis block for performing a Direction-of-Arrival analysis of the value representing active intensity to obtain the source directions.

15. The apparatus according to claim 9, further including a mixer unit for mixing the enhanced Ambisonics signal of at least $2^{nd}$ order with another HOA input signal of a higher order or a different Ambisonics format, wherein a HOA signal that includes a mixture of the input signal and said another HOA input signal is obtained.

16. A non-transitory computer readable storage medium having stored thereon computer readable instructions that, when executed on a computer, cause the computer to perform a method for enhancing directivity of a $1^{st}$ order Ambisonics signal having coefficients of $0^{th}$ order and $1^{st}$ order, the method comprising:
filtering the input signal in an Analysis Filter bank, wherein four frequency domain channels are obtained that are a frequency domain representation of the $1^{st}$ order Ambisonics signal, and wherein one first frequency domain channel of the frequency domain channels represents $0^{th}$ order coefficients and the three remaining frequency domain channels represent $1^{st}$ order coefficients;
performing a Sound Field Analysis of the four frequency domain channels, whereby source directions and a diffuseness estimate are obtained;
filtering in a filter the first frequency domain channel that has $0^{th}$ order coefficients to determine a direct sound based on the diffuseness estimate;
encoding in a Higher Order Ambisonics encoder the direct sound component based on the source directions, wherein the direct sound component is encoded in Ambisonics format with a pre-defined order that has a value of at least two, wherein encoded direct sound in Ambisonics format of the pre-defined order is obtained, and wherein the encoded direct sound in Ambisonics format of the pre-defined order including Ambisonics coefficients of an order higher than $1^{st}$ order;
selecting from the obtained encoded direct sound in Ambisonics format of the pre-defined order Ambisonics coefficients of $2^{nd}$ order or higher order, wherein coefficients of $1^{st}$ order and $0^{th}$ order are omitted; and
combining in a Combining and Synthesis unit a signal representing the selected Ambisonics coefficients of $2^{nd}$ order or higher order from the encoded direct sound with the input signal, wherein an enhanced directivity Ambisonics signal of at least $2^{nd}$ order is obtained.

17. The computer readable storage medium according to claim 16, wherein in the method said combining the selected Ambisonics coefficients of $2^{nd}$ order or higher order from the encoded direct sound with the input signal includes:
combining in a frequency domain Combiner unit Ambisonics coefficients of the four frequency domain channels with the selected frequency coefficients of the selected Ambisonics coefficients of $2^{nd}$ order or higher order from the encoded direct sound, wherein a signal is obtained that is a frequency domain representation of an Ambisonics signal of at least $2^{nd}$ order, and filtering in a Synthesis Filter Bank the obtained signal to determine a time domain representation of an enhancement Higher Order Ambisonics signal that has coefficients of at least $2^{nd}$ order.

18. The computer readable storage medium according to claim 16, wherein in the method said combining the selected Ambisonics coefficients of $2^{nd}$ order or higher order from the encoded direct sound with the input signal includes:

filtering in a synthesis filter bank the selected Ambisonics coefficients of $2^{nd}$ order or higher order from the encoded direct sound, wherein a time domain representation of an enhancement Higher Order Ambisonics signal is obtained that includes coefficients of $2^{nd}$ order or higher order;

combining in a time domain combiner Ambisonics coefficients representative of the input signal with the time domain representation of said enhancement Higher Order Ambisonics signal of $2^{nd}$ order or higher order, wherein a time domain representation of an Ambisonics signal of at least $2^{nd}$ order is obtained that has enhanced directivity as compared to the input signal.

19. The computer readable storage medium according to claim 16, wherein in the method said encoding the direct sound component in Ambisonics format with pre-defined order, the Higher Order Ambisonics encoder uses B-format.

20. The computer readable storage medium according to claim 16, wherein in the method said encoding the direct sound component in Ambisonics format with pre-defined order, the Higher Order Ambisonics encoder uses an Ambisonics format other than B-format, further including:

re-formatting in a HOA format adaptation unit, before said combining, the input signal according to the Ambisonics format other than B-format, to obtain re-formatted Ambisonics coefficients of the input signal, and wherein, in said combining, the combiner combines the re-formatted Ambisonics coefficients of the input signal with the time domain representation of said enhancement Higher Order Ambisonics signal of $2^{nd}$ order or higher order.

21. The computer readable storage medium according to claim 16, wherein in the method said performing a Sound Field Analysis of the four frequency domain channels includes:

performing an active Intensity analysis of the four frequency domain channels, wherein a value representing active intensity is obtained;

performing a diffuseness analysis of the four frequency domain channels, wherein said diffuseness estimate is obtained; and performing a Direction-of-Arrival analysis of the value representing active intensity to obtain the source directions.

22. The computer readable storage medium according to claim 16, wherein in the method said mixing the enhanced Ambisonics signal of at least $2^{nd}$ order with a further HOA input signal of a higher order or a different Ambisonics format, wherein a HOA signal that includes a mixture of the input signal and said further HOA input signal is obtained.

23. The computer readable storage medium according to claim 16, wherein in the method said resulting HOA signal has $O=(N_{order}+1)^2$ components for 3D realizations and $O=(2 N_{order}+1)$ components for 2D realizations, wherein $N_{order}$ is the order of the HOA encoder, and the resulting HOA signal has $C_n^m$ coefficients according to $C_n^m$: $[A_0^0, A_1^{-1}, A_1^0, A_1^1, B_2^{-2}, B_2^{-1}, B_2^0, B_2^1, B_2^2, \ldots ']$, wherein the $A_i^j$ are coefficients of the input signal and the $B_i^j$ are the selected HOA coefficients from the encoded direct sound.

* * * * *